United States Patent
Bucholz et al.

(10) Patent No.: US 6,585,457 B2
(45) Date of Patent: Jul. 1, 2003

(54) ABRASIVE GENERATION OF NON-METALLIC GEAR

(75) Inventors: Thomas J. Bucholz, Sanford, MI (US); David E. King, Freeland, MI (US); Donald D Albrecht, Saginaw, MI (US); Theodore Glenn Seeger, Saginaw, MI (US); Jeffery Alan Zuraski, Saginaw, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/748,485

(22) Filed: Dec. 27, 2000

(65) Prior Publication Data

US 2002/0081162 A1 Jun. 27, 2002

(51) Int. Cl.$^7$ .............................. B23F 21/16; B26D 1/12
(52) U.S. Cl. ............................... 407/23; 407/27; 451/70
(58) Field of Search .............................. 407/23, 24, 25, 407/26, 27, 28, 29; 451/70, 55, 67, 69, 147, 148, 253

(56) References Cited

U.S. PATENT DOCUMENTS

| | | | | |
|---|---|---|---|---|
| 3,892,022 A | * | 7/1975 | Johnson | 407/26 |
| 4,735,115 A | * | 4/1988 | Yamada et al. | 219/69.17 |
| 4,807,401 A | * | 2/1989 | Atwater | 451/196 |
| 4,841,676 A | | 6/1989 | Barwasser | |
| 4,961,289 A | * | 10/1990 | Sulzer | 409/11 |
| 5,338,134 A | * | 8/1994 | Peng | 407/23 |
| 5,379,554 A | * | 1/1995 | Thurman et al. | 451/177 |
| 5,667,428 A | * | 9/1997 | Lunn | 451/70 |
| 5,823,857 A | | 10/1998 | Tan | |
| 5,931,612 A | | 8/1999 | Basstein | |
| 6,336,777 B1 | * | 1/2002 | Fisher et al. | 409/26 |

FOREIGN PATENT DOCUMENTS

| | | |
|---|---|---|
| JP | 60161024 | 8/1985 |
| JP | 62044310 | 2/1987 |
| JP | 10329039 | 12/1998 |
| WO | WO 94/19135 | 9/1994 |

* cited by examiner

Primary Examiner—A. L. Wellington
Assistant Examiner—Brian D Walsh
(74) Attorney, Agent, or Firm—Edmund P. Anderson

(57) ABSTRACT

A hob cutter includes a cutting portion and an abrading portion in mechanical communication with the cutting portion. The cutting portion includes a plurality of hob teeth having at least one gash extending therethrough to define a cutting face on a front of each hob tooth and a trailing face on a back of each hob tooth. The abrading portion includes a plurality of abrading teeth positioned adjacent to each other. Both the hob teeth and the abrading teeth are continuously formed and helically arranged.

10 Claims, 5 Drawing Sheets

ABRASIVE GENERATION OF NON-METALLIC GEAR

TECHNICAL FIELD

This disclosure relates to gear hobbing, and, more particularly, to a hob cutter that generates and abrasively finishes a face gear.

BACKGROUND

Gears used in applications in which components are rotated at extremely high speeds (e.g., automotive and aircraft drive train applications) generally require that the gears be manufactured with significant precision. Such precision usually requires an elaborate multi-step manufacturing process in which the gear is first cut to produce teeth that are close to the final shape desired within a small tolerance limit, then removed from the cutting machine and placed in a finish-cutting or grinding machine to form the teeth into the precise shape having the proper dimensions.

Prior art plastic gears used in such applications are typically cut with special hob cutters on standard hobbing equipment. Some of the difficulties encountered with using special equipment in conjunction with standard hobbing equipment to generate plastic gears include spacing problems associated with the positioning of the hobs on a multiple start cutter, deflection of the plastic material of the workpiece during the cutting process, burrs of plastic left on the workpiece after the cutting process, and variations from standard hob cutting tooling that limits the ability to minimize the variation within the total gear geometry. Furthermore, a multi-step manufacturing process in which a cut gear is removed from one machine to be placed in another machine for final processing increases the amount of handling of the gear, and, therefore, increases the cost of labor associated with the final product.

A method of hob cutting gears in which the above-mentioned drawbacks are alleviated is needed.

SUMMARY

A hob cutter is used to generate and abrasively finish face gears fabricated from non-metallic materials. In a typical application, the synchronous capabilities of a CNC hobbing machine are used to maintain the relationship of the cutter to a workpiece as the cutter and workpiece are manipulated to produce a finished face gear with a minimum of operator intervention. The hob cutter includes a cutting portion and an abrading portion positioned adjacent to and in mechanical communication with the cutting portion. The cutting portion includes a plurality of hob teeth adjacently positioned to each other and helically arranged and at least one gash extending therethrough to define a cutting face on a front of each of the teeth and a trailing face on a back of each of the teeth. An upper edge is formed between the cutting face and the trailing face, and a juncture of the upper edge and the cutting face forms a cutting point. Each of the teeth is cammed to enable the cutter to create a "chip" in the workpiece. The abrading portion of the cutter includes a plurality of abrading teeth positioned adjacent to each other continuously formed and helically arranged. An abrasive surface is deposited onto the cutting portion of the cutter to facilitate the cutting of the workpiece.

In another embodiment, the hob cutter comprises a plurality of abrading teeth positioned adjacent each other and arranged helically without the cutting portion. Each of the abrading teeth have disposed thereon abrasive surfaces, which may be of varying degrees of roughness, in order to "cut" the teeth of the face gear. The abrasive surfaces may be arranged such that abrading teeth having decreasing degrees of roughness successively engage the workpiece. Abrasive surfaces having varying degrees of roughness may be disposed on the flank surfaces of a single abrading tooth.

A method of generating a face gear involves using a hob cutter to cut teeth into a workpiece and abrading the teeth cut into the workpiece in a sequential manner using an abrasive portion in mechanical communication with the hob cutter. The use of the hob cutter to cut the teeth involves engaging a cutting portion of the hob cutter with the workpiece. The cutting and abrading of the workpiece may be articulated through the use of a CNC hobbing machine.

The disclosed hob cutter in accordance with its proper method of use enables the teeth of a manufactured face gear to be more accurately shaped and dimensioned in a single processing step. Accuracy in the dimensioning of the face gears minimizes material and production costs associated with the manufacturing process by limiting raw material waste and minimizing the amount of labor required to manufacture the gear. This allows for the production of a higher quality gear while ensuring a better total functionality of the system into which the gears are installed.

DETAILED DESCRIPTION

The abrasive generation of non-metallic face gears is performed by a hobbing device as is described below and shown in the accompanying Figures. The hobbing device includes a cutting portion for generating a face gear and an abrasive portion for simultaneously finishing the gear. The synchronous capabilities of a typical CNC hobbing machine are used to maintain the relationship of the hobbing device to a workpiece from which the face gear is generated. The hobbing device is rotated about its longitudinal axis to generate the tooth of the face gear while being translated axially to abrasively finish the generated teeth. This system allows for the improved control of the gear form while allowing for a finer micro finish on the flank surfaces of the gear teeth and the removal of large burrs produced as a result of the machining process. Although the description and Figures depict one particular embodiment of the hobbing device, it will be appreciated by those of skill in the art that a multitude of variations may be incorporated into the design in order to provide for a multitude of configurations of face gear/pinion gear sets.

Figure 1:
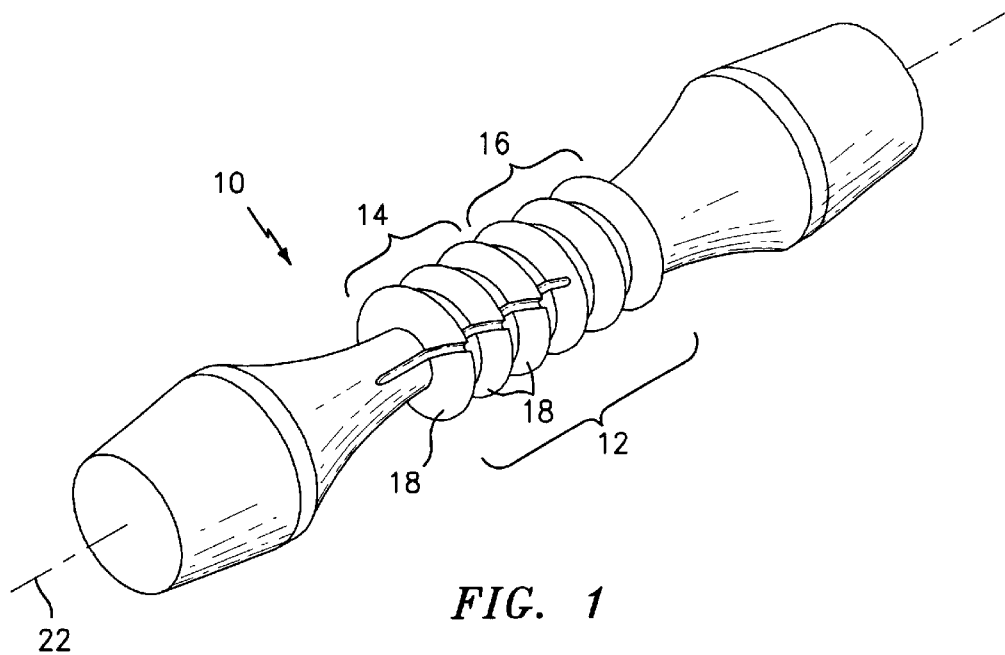
FIG. 1 is a perspective view of an embodiment of a hob cutter having a cutting portion and an adjacently positioned abrading portion.
Figure 2:
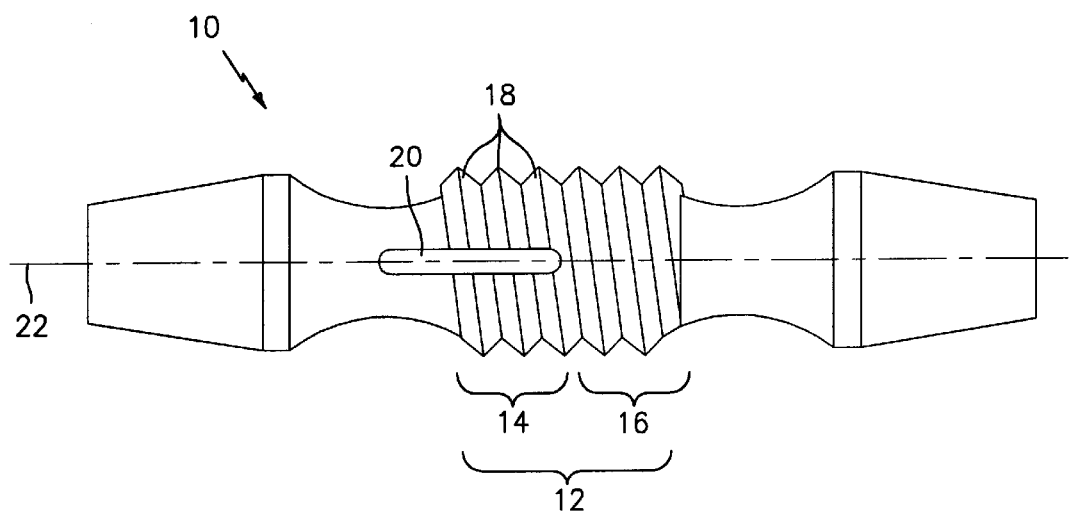
FIG. 2 is a plan view of the preferred embodiment of the hob cutter.

Referring to FIGS. 1 and 2, the hob cutter is shown generally at 10 and is hereinafter referred to as "cutter 10". Cutter 10 comprises a body portion, shown generally at 12, having a cutting portion, shown generally at 14, disposed over about one half the length of body portion 12 and an adjacently positioned abrading portion, shown generally at 16, disposed over the remainder of the length of body portion 12. Abrading portion 16 is described below with reference to FIG. 6. Cutting portion 14 comprises a plurality of hob teeth 18 positioned adjacent to each other and having at least one gash 20 extending therethrough parallel to a longitudinal axis 22 of body portion 12. Hob teeth 18 are arranged in a helical gear arrangement. Gash 20 is further described below with reference to FIGS. 3 and 4.

Figure 3:
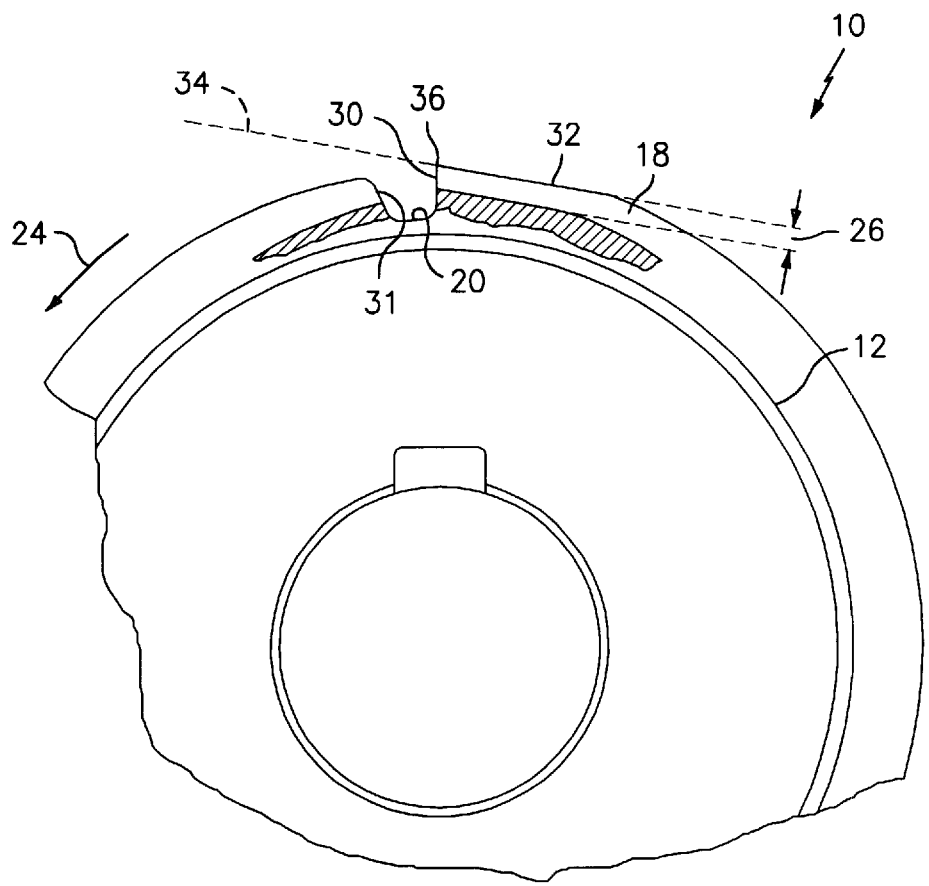
FIG. 3 is a side sectional view of the body portion of the hob cutter showing a hob tooth arrangement.
Figure 4:
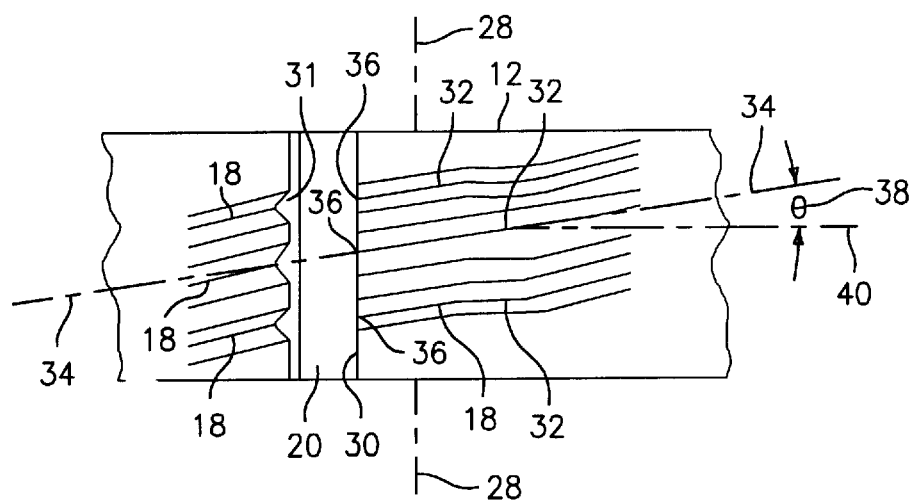
FIG. 4 is a plan view of a section of the body portion of the hob cutter showing the hob tooth arrangement.

Referring now to FIGS. 3 and 4, hob teeth 18 are shown in greater detail. Each hob tooth 18 is distributed over the circumference of a cross section of body portion 12 and is configured as a protrusion extending normally from a surface of body portion 12. Body portion 12 rotates in the direction shown by arrow 24 to generate the face gear (not shown) from the workpiece (not shown). A "front" and "back" of each hob tooth 18 is defined by gash 20, which is used to create chips in the workpiece in order to form the teeth of the face gear. In one embodiment of cutter 10, a single gash 20 extends longitudinally along body portion 12 parallel to an axis of rotation 28 of cutter 10 that corresponds to longitudinal axis 22 of body portion 12. The width of gash 20 is such that the back of each hob tooth 18 is prevented from coming into contact with the workpiece during the machining process. Because cutter 10 includes only a single gash, the same hob tooth 18 is used to generate a single tooth of the finished face gear, and thus cutter 10 is of the "single start" configuration.

Each hob tooth 18 is cammed to facilitate the cutting of the workpiece by making the front of each hob tooth 18 extend above the back of the same hob tooth 18 by a distance 26. The front of each hob tooth 18 defines a cutting face 30, the back of each hob tooth 18 defines a trailing face 31, and a "top" of each hob tooth 18 defines a clearance edge 32. Cutting face 30 typically extends perpendicular to a bottom surface 33 of gash 20. Clearance edge 32 of each hob tooth 18 corresponds with a generatrix 34, which is an imaginary line that extends parallel to the edges of each protrusion that define each hob tooth 18. A cutting point 36 is formed at the intersection of cutting face 30 and clearance edge 32. The shape of cutting face 30 corresponds to a desired profile of the teeth of the face gear to be generated. A lead angle, shown in FIG. 4 at 38, which is an angle formed by one of generatrix 34 intersecting cutting point 36 and an imaginary line 40 that is perpendicular to axis of rotation 28, is defined at the juncture of cutting point 36 and clearance edge 32.

Figure 5A:
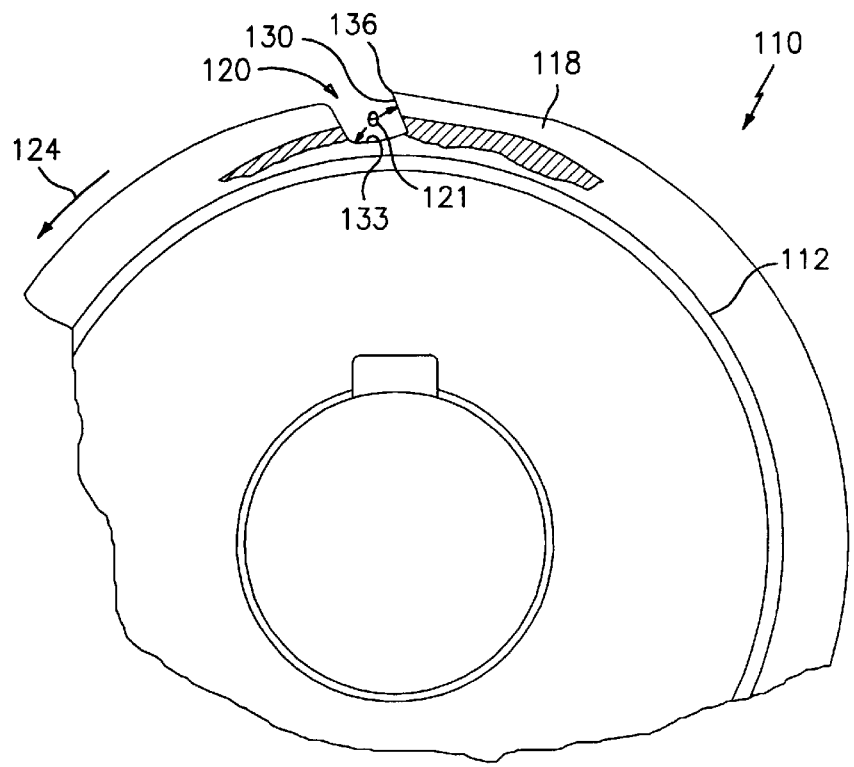
FIG. 5A is a side sectional view of the body portion of an alternate embodiment of the hob cutter showing a hob tooth arrangement.
Figure 5B:
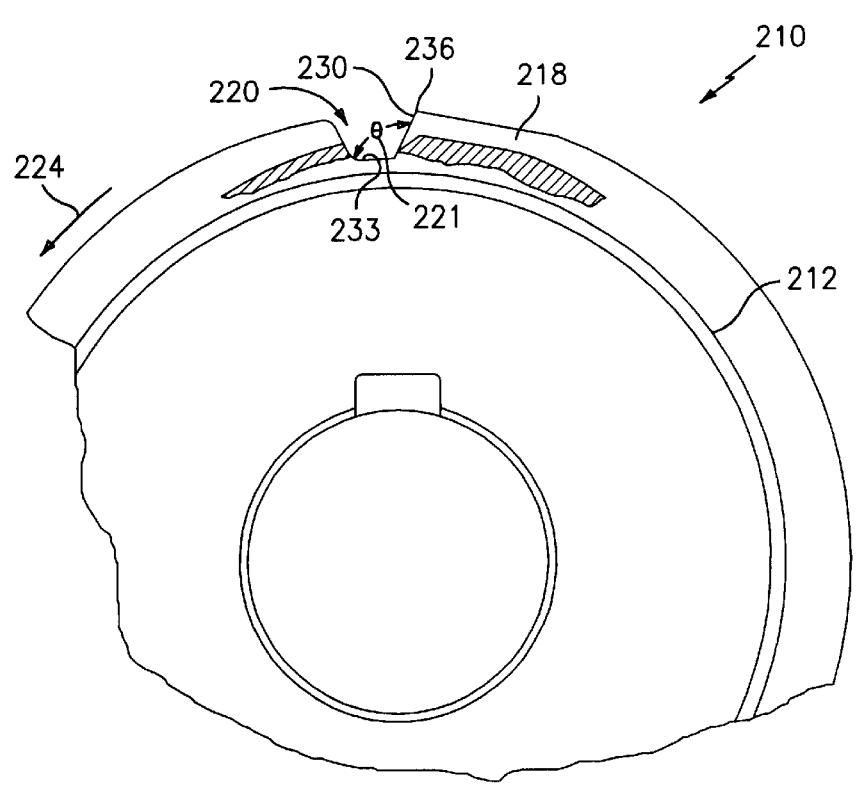
FIG. 5B is a side sectional view of the body portion of an embodiment of the hob cutter showing a hob tooth arrangement.

Referring now to FIGS. 5A and 5B, another embodiment of a cutter is shown. In FIG. 5A, a cutter is shown generally at 110 as having a hob tooth arrangement 118 in which a cutting face 130 is raked in a positive direction. The direction of rotation of cutter 110 is indicated by an arrow 124. A gash, shown generally at 120, is formed in a body portion 112 of cutter 110 such that cutting face 130 extends away from a bottom surface 133 of gash 120 at an acute angle 121. In such a configuration, each tooth provides an initial piercing of the workpiece by a cutting point 136 before actually cutting the material. Because of the smaller surface area of cutting point 136 (as opposed to the larger surface area of cutting face 30 of cutter 10 shown in FIGS. 1 through 4), the initial piercing of the workpiece by cutting point 136 provides less stress to the workpiece and reduces the undesirable fracturing of material along the cutting lines.

In FIG. 5B, a cutter is shown generally at 210 as having a hob tooth arrangement 218 in which a cutting face 230 is raked in a negative direction. The direction of rotation of cutter 210 is indicated by an arrow 224. A gash, shown generally at 220, is formed in a body portion 212 of cutter 210 to define a cutting point 236 such that cutting face 230 extends away from a bottom surface 233 of gash 220 at an obtuse angle 221. In such a configuration, each tooth provides a more powerful initial engagement of the workpiece to "rip" the material from the workpiece to form the teeth of the face gear.

Figure 6:
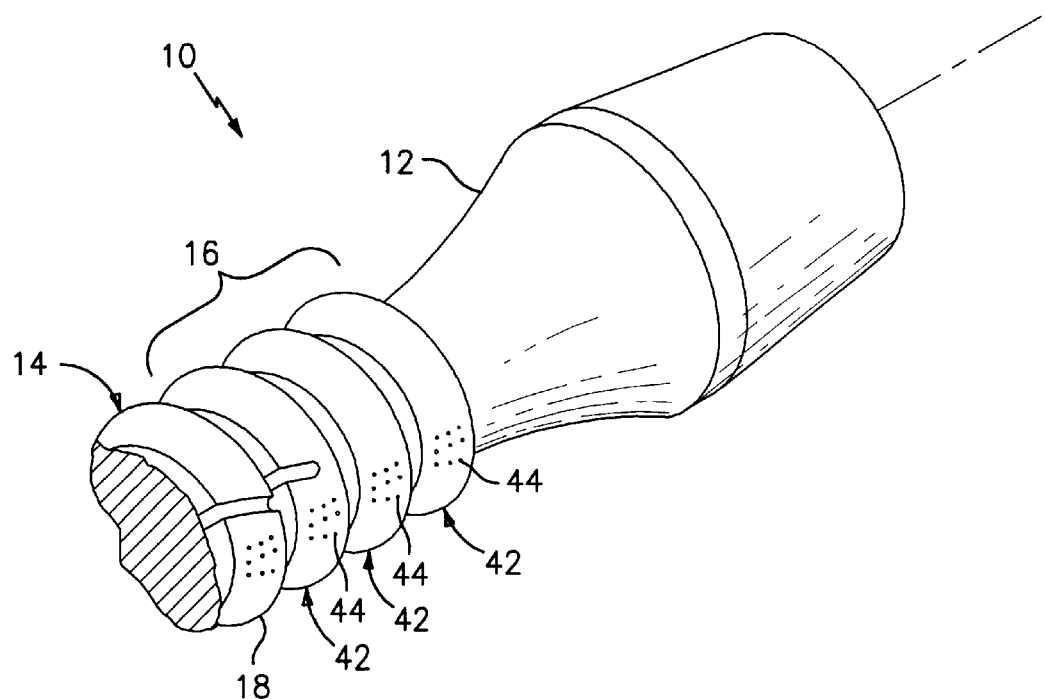
FIG. 6 is a perspective view of the abrading portion of the body portion of the hob cutter.

Referring now to FIG. 6, abrading portion is shown generally at 16. In a preferred embodiment, abrading portion 16 is positioned adjacent to and in mechanical communication with cutting portion 14 and comprises a plurality of abrading teeth, shown generally at 42, positioned adjacent each other and arranged in a helical configuration similar to the helical arrangement of hob teeth 18. Abrading teeth 42 are similar in structure and dimension to hob teeth 18; however, the arrangement of abrading teeth 42 is not interrupted by the presence of a gash extending longitudinally therethrough. Each abrading tooth 42 is, therefore, a single continuous protrusion positioned on a cross section of body portion 12 of cutter 10.

Abrading portion 16 is connected to cutting portion 14 and configured to rotate simultaneously with cutting portion 14 upon rotation of body portion 12. Abrading teeth 42 are positioned to finish the face gear immediately subsequent to the generation of the gear teeth by the rotation of hob teeth 18. Each abrading tooth 42 includes an abrasive surface 44 disposed thereon to finish the workpiece to form the face gear. Abrasive surface 44 is deposited onto each abrading tooth 42 by coating, etching, bonding, forming, or a similar method and is of sufficient roughness to enable rotational motion of body portion 12 to grind the surfaces of the gear teeth of the face gear cut by hob teeth 18 in order to finish the gear teeth within acceptable manufacturing tolerances and having a proper surface texture.

Figure 7:
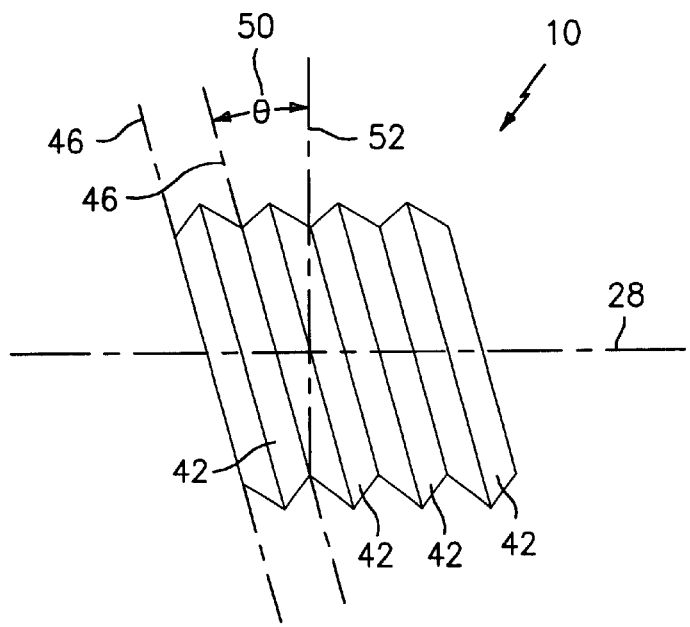
FIG. 7 is a schematic view of the abrading portion of the hob cutter showing the lead angle of the abrading teeth.

Referring to FIG. 7, a lead angle 50 that substantially corresponds to the lead angle of the hob teeth is shown for the abrading surface of cutter 10. Lead angle 50 is defined by generatrices 46 extending parallel to the edges of each abrading tooth 42 along an outer edge 48 of each abrading tooth 42. Lead angle 50 is formed by one of generatrices 46 and an imaginary line 52 that is perpendicular to axis of rotation 28.

Figure 8:
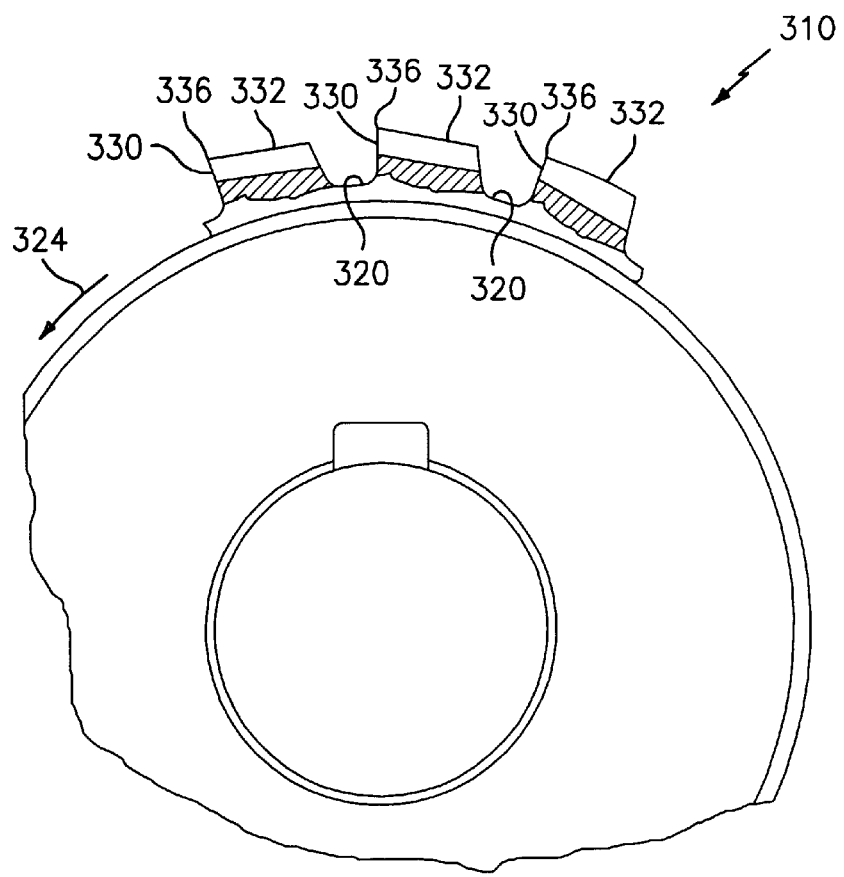
FIG. 8 is a side sectional view of an embodiment of a hob cutter having multiple gashes in the cutting portion.

In another embodiment, as shown in FIG. 8, a multiple start cutter having a direction of rotation indicated by an arrow 324 is shown generally at 310. Multiple start cutter 310 is similar to cutter 10 shown FIGS. 1 through 4; however, a cutting surface of multiple start cutter 310 is defined by a plurality of gashes 320 oriented longitudinally on a body portion 312. Each gash 320 necessitates the forming of a cutting face 330 (which may or may not be raked), a clearance edge 332, and a cutting point 336. An abrading portion is positioned adjacent to the cutting portion to abrasively finish a workpiece in the same manner as in the embodiments described above. The abrading portion substantially conforms to the dimensions and configuration of abrading portion 16 of cutter 10 shown in FIGS. 1 and 2.

Figure 9:
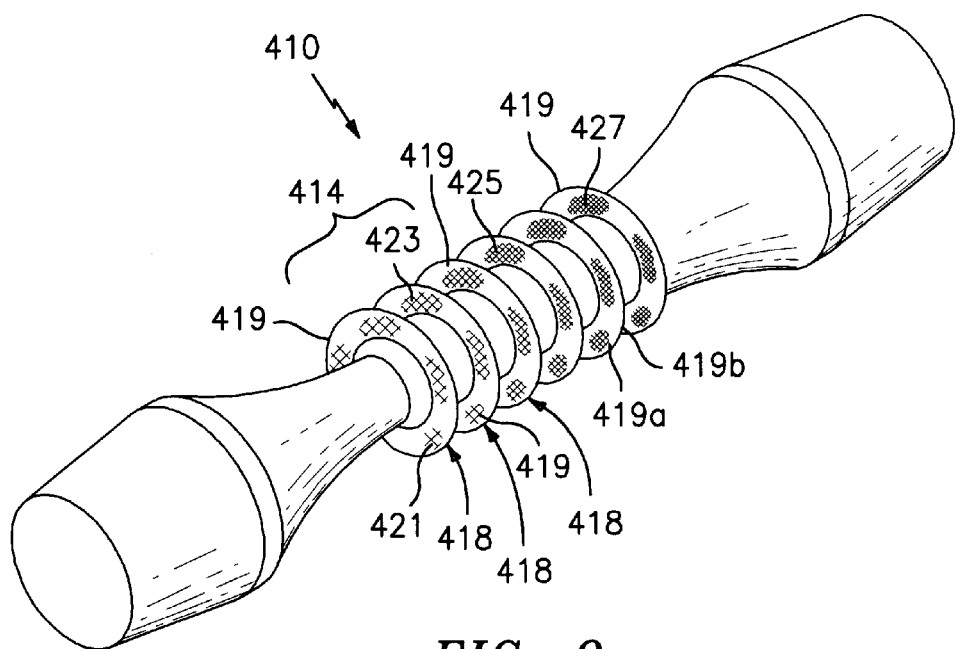
FIG. 9 is a perspective view of an embodiment of a hob cutter having no gashes in the cutting portion and hob teeth having flank surfaces configured to abrade a workpiece.

In still another embodiment, as shown generally in FIG. 9, a cutter 410 may contain no gashes in a cutting portion 414, but may, instead, have hob teeth 418 in which flank surfaces, shown generally at 419, are of variable roughness. Preferably, the roughness of each flank surface 419 is graduated from a very aggressive finish 421 to a lesser aggressive finish 423 to a fine finish 425 to a very fine finish 427. In such an embodiment, as the non-gashed cutting portion 414 engages the workpiece, flank surfaces 419 having the more aggressive finish 421 "cut" the workpiece to form the teeth of the face gear being generated. As the work progresses, flank surfaces 419 of the lesser aggressive finish 423 further define the teeth of the face gear, and flank surfaces 419 of the fine finish 425 and very fine finish 427 abrade and polish the teeth to their final dimensions and desired textures. Opposing flank surfaces 419*a*, 419*b* of each hob tooth 418 may be of varying roughnesses to more gradually finish the workpiece to its final form.

In any of the embodiments described above, to effectuate the generation of the face gear from the workpiece, the cutter is articulated through the use of the CNC hobbing machine. The cutter is translated axially and rotatably into a "blank" of material (not shown), which is typically a non-metallic material such as a plastic or similar material. The tangential force of the axial translation and rotational motion of the cutter then removes the material designated by a control portion (not shown) of the CNC hobbing machine to generate the correct gear tooth geometry of the face gear. The feed rate of the workpiece, as well as the speed at which the cutter engages and translates the workpiece, varies according to each specific non-metallic material and the structure of each particular face gear to be generated. Upon formation of the newly formed teeth (not shown) in the blank, the axial and rotational translation of the cutter causes the abrading portion to come into contact with the teeth of the face gear. As the abrading portion contacts the newly formed teeth, the teeth are abrasively finished to the desired texture and shape. Such a configuration eliminates the step of removing the roughly or "net" cut blank from the cutting machine and placing it into the finishing machine for final processing.

By utilizing the above-mentioned hob cutting apparatus and its method of use, the form, shaping, and run out characteristics of the manufactured non-metallic face gear are more accurately controlled. More accurate control of the manufacturing process enables for more precise control of the dimensional characteristics of the produced non-metallic gear. By precisely controlling the dimensional characteristics of the gear, superior functionality of the total system in which the gear is incorporated is developed.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A hob cutter, comprising:
    a body portion having a first end and a second end, the body portion lying along a longitudinal axis;
    a cutting portion defining a first part of the body portion, the cutting portion having a first end and a second end, the first end of the cutting portion adjacent the first end of the body portion;
    an abrading portion defining a second part of the body portion, the abrading portion having a first end and a second end, the second end of the abrading portion adjacent the second end of the body portion, wherein the second end of the cutting portion is contiguous with the first end of the abrading portion;
    helical teeth continuously arranged within the cutting portion and the abrading portion from the first end of the cutting portion to the second end of the abrading portion; and,
    a longitudinal gash in the cutting portion, the gash extending through the teeth in the cutting portion and ending at the second end of the cutting portion.

2. The hob cutter of claim 1 wherein the teeth in the cutting portion define hob teeth and wherein the gash defines a cutting face on a front of each of said hob teeth and a trailing face on a back of each of said hob teeth.

3. The hob cutter of claim 2 wherein each of said hob teeth includes an upper edge between said cutting face and said trailing face.

4. The hob cutter of claim 3 wherein a juncture of said upper edge and said cutting face form a cutting point.

5. The hob cutter of claim 4 wherein a lead angle is defined by a generatrix extending parallel to said upper edge and intersecting an imaginary line extending perpendicular to an axis of rotation of said hob teeth.

6. The hob cutter of claim 5 wherein each tooth of said hob teeth extends above an edge defined by a juncture of said trailing face and said upper face to positively cam each of said hob teeth.

7. The hob cutter of claim 2 wherein said gash extends through said hob teeth so as to be substantially perpendicular to an axis of rotation of said hob teeth.

8. The hob cutter of claim 1 wherein said abrading portion comprises abrading teeth positioned adjacent to each other, said abrading teeth being continuously formed and helically arranged.

9. The hob cutter of claim 8 wherein a lead angle of each tooth of said abrading teeth is defined by an intersection of a generatrix extending parallel to an outer edge of each of said abrading teeth and an imaginary line extending perpendicular to an axis of rotation of said abrading teeth.

10. The hob cutter of claim 9 wherein an abrasive surface is deposited onto each of said abrading teeth.

* * * * *